United States Patent [19]

Dixon

[11] 4,222,835

[45] Sep. 16, 1980

[54] IN DEPTH CURING OF RESINS INDUCED BY UV RADIATION

[75] Inventor: George D. Dixon, Monroeville, Pa.

[73] Assignee: Westinghouse Electric Corp., Pittsburgh, Pa.

[21] Appl. No.: 909,420

[22] Filed: May 25, 1978

[51] Int. Cl.³ ............................. C08F 8/00; C08F 2/46
[52] U.S. Cl. .......................... 204/159.16; 204/159.15; 204/159.18; 428/251; 204/159.19; 204/159.23; 204/159.24; 427/54.1; 428/461
[58] Field of Search ...................... 204/159.23, 159.24, 204/159.15, 159.16, 159.18, 159.19

[56] References Cited

U.S. PATENT DOCUMENTS

| | | | |
|---|---|---|---|
| 2,529,315 | 11/1950 | Serniuk | 526/204 |
| 3,784,524 | 1/1974 | Morgan | 260/77.5 CR |
| 3,876,518 | 4/1975 | Borden et al. | 204/159.14 |
| 3,937,855 | 2/1976 | Gruenwald | 427/54 |
| 3,948,740 | 4/1976 | Phalangas | 204/159.23 |
| 4,022,855 | 5/1977 | Hamblen | 264/1 |
| 4,071,424 | 1/1978 | Dart et al. | 204/159.15 |

*Primary Examiner*—Richard B. Turer
*Attorney, Agent, or Firm*—R. D. Fuerle

[57] ABSTRACT

A composition is prepared of a liquid vinyl monomer, a UV-activated photo-initiator, a thermal initiator, and an accelerator. The composition also preferably contains a free-radical scavenger and a vinyl oligomer. Upon exposure to ultraviolet light the photo-initiator initiates polymerization in the surface layer thereby generating sufficient heat to activate the thermal initiator and cause the polymerization to proceed throughout the bulk of the monomer.

23 Claims, No Drawings

IN DEPTH CURING OF RESINS INDUCED BY UV RADIATION

BACKGROUND OF THE INVENTION

In order to reduce the amount of energy needed for polymerizing vinyl monomers and for evaporating and burning solvents they are in, various types of radiation cures have been tried. Ionizing radiation, such as X-rays, randomly knocks off atoms and groups producing a highly cross-linked polymer. However, because ionizing radiation is difficult to handle safely, it has not been widely used.

Ultraviolet radiation has also been used in combination with a photo-initiator which initiates the polymerization; but because of the absorption characteristics of materials, the light can only penetrate to a depth of about 20 mils. When the monomer is pigmented or opaque materials are present in the resin, the depth of cure is even less.

SUMMARY OF THE INVENTION

I have found that if an accelerator is present in the monomer composition, a photo-initiator and a thermal initiator can act synergistically with UV light so that the depth of cure achieved is much greater than when either are used alone. My invention has resulted in curing at depths of 500 mils or greater.

A great advantage of this invention is that no external source of heat, other than the UV light, is required for the cure. Curing ovens and the natural gas they use for heating are not needed.

Another important advantage of this invention is that no solvent is used in the final composition. Since solvents pollute the air when they evaporate and therefore must be burned, energy is saved in both the evaporation and incineration of solvent. Also, a solvent can sometimes produce bubbles or blisters in the product when it volatilizes, and this is also avoided.

Finally, because the thermal initiator completes the polymerization begun by the photo-initiator, the monomer is cured even when pigmented or when opaque material is present. Also, because the subsequent thermal reaction is omnidirectional, the resin will cure in shadowed areas thus overcoming the line-of-sight limitation normally associated with radiation curing.

PRIOR ART

U.S. Pat. Nos. 3,948,740, 3,876,518, and 4,022,855 disclose the polymerization of an ethylenically unsaturated monomer composition containing peroxides or azo compounds by exposure to ionizing radiation such as X-rays.

U.S. Pat. No. 3,784,524 discloses UV curing of resins containing photo-initiators.

U.S. Pat. No. 3,937,855 discloses the UV curing of the skin of a resin to prevent dripping prior to thermal cure.

DESCRIPTION OF THE INVENTION

THE MONOMER

The monomer is a liquid having the general formula $CH_2=CH-R$ where R is an electron withdrawing group. Acrylates are preferred because they have high reactivity, low toxicity, and result in a product having excellent physical and electrical properties. Tetraethylene glycol diacrylate (TEGDA), 2-hydroxyethyl acrylate (HEA), and hexanediol diacrylate (HDDA) are the preferred monomers because of their low viscosity, their high reactivity, and because they readily dissolve many pre-polymers to form low viscosity solutions. Trimethylolpropane triacrylate (TMPTA) is preferred for its high reactivity, although its viscosity is also higher. Ethyl methacrylate (EMA) and 2-ethylhexyl acrylate (EHA) are preferred for low viscosity, although their reactivity is also lower. In order to achieve both low viscosity and high reactivity, it is often desirable to blend various monomers having one or the other of these properties. Other monomers include allyl methacrylate (AM), acrylic acid (AA), acrylamide (AAM), acrylonitrile (AN), benzyl acrylate (BA), beta-cyanoethyl acrylate (BCEA), bis-phenol A dimethacrylate (BPADM), ethyl methacrylate (EA), ethylene glycol dimethacrylate (EGDM), neopentyl glycol diacrylate (NPGDA), styrene (STY), vinyl acetate (VA), vinyl imidazole (VI), and vinyl pyrollidone (VP). Mixtures of monomers are also contemplated.

OLIGOMERS

Oligomers are preferably included in the composition to improve the physical properties of the product. The oligomer must have at least one reactive vinyl group so that it is reactive with the monomer. Acrylic or methacrylic functionality is preferred as those oligomers have the best properties. The oligomer should not have a molecular weight greater than 10,000 because higher molecular weight oligomers are less soluble and, because more monomer is required for solution, the properties of the product are poorer. Oligomers having molecular weights up to about 2000 are preferred as they are more soluble.

The minimum molecular weight of most oligomers is about 400. The oligomer may be an acrylic terminated epoxy, polyester, polyurethane, polyimide, polyacrylate, alkyd, phenolic alkyd, or other similar type of oligomer. If the oligomer is a solid, it must be soluble in the monomer.

The oligomer may constitute up to about 90% (all percentages herein are by weight based on total composition weight) of the total composition, but less than about 20% is usually not worth the trouble. About 50 to about 80% is preferred. If large amounts of oligomers are used, it will probably have to be a liquid oligomer in order for the total composition to be a liquid.

Particular oligomers that have been used and have worked well are the reaction product of hydroxy ethyl acrylate and toluene diisocyanate in a 1 to 1 molar ratio, a polyester containing maleic anhydride sold by Westinghouse Electric Corp. under the trade designation "BT 4487-2," and a polyester containing fumaric acid sold by Hoechst under the trade designation "Alpolit 81."

Also useful is a resin which is made from a mixture of 2820 pbw glycerol, 2360 pbw isophthalic acid, 5750 pbw soya fatty acids, and 593 pbw maleic anhydride. The mixture is dissolved in 910 pbw 2-ethyl hexyl acrylate, 2220 pbw tetraethylene glycol diacrylate, and 4680 pbw trimethylolpropane triacrylate. Mixtures of oligomers can be used.

PHOTO-INITIATOR

The composition must contain about 0.01 to about 4% of a photo-initiator. More than about 4% is unnecessary and may make the composition unstable and less than about 0.01% is insufficient to cure the monomer. A preferred concentration is about 0.075 to about 1%. It is the purpose of the photo-initiator to initiate polymerization of the monomer when exposed to UV radiation.

Photo-initiators include benzoin ethers, ketones such as benzophenone, Michler's ketone, ketones accelerated with amines such as dimethyl ethanolamine, and thioxanthen-9-one derivatives. Liquid photo-initiators such as benzoin ethers and diethoxyacetophenone are preferred for ease of handling and because no solvent is needed for their dissolution. Solid photo-initiators are less preferred because they often require small amounts of a solvent for dissolution. Thioxanthen-9-one derivatives are the least satisfactory photo-initiators because of their poor solubility in solvents. Other photo-initiators include benzophenone, acetophenone quinone, methyl ethyl ketone, valero-phenone, hexanophenone, γ-phenylbutyrophenone, p-morpholinopropiophenone, dibenzosuberone, 4-morpholinobenzophenone, 4-morpholinodeoxybenzoin, p-diacetylbenzene, 4-aminobenzophenone, benzaldehyde, α-tetraline, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]-anthracen-7-one, 1-naphthaldehyde, 4,5'-bis(dimethylamino)-benzophenone, fluorene-9-one, 1'-acetonaphthone, 2'-acetonaphthone, 2,3-butanedione, and the like. Mixtures of photo-initiators are also contemplated.

THERMAL INITIATOR

The composition must contain a thermal initiator. The thermal initator initiates the polymerization of the monomer when it is heated as a result of the exothermic polymerization reaction initiated by the photo-initiator. The amount of thermal initiator should be less than about 4% as more is unnecessary and may make the composition unstable. On the other hand, less than about 0.01% is insufficient to cure the monomer. A preferred concentration is about 0.075 to about 1%.

Peroxides, hydroperoxides and certain azo compounds are generally suitable as thermal initiators. Examples of thermal initiators include lauroyl peroxide, cumene hydroperoxide, 2,5-dimethyl 2,5-bis(hydroperoxy)hexane, hydrogen peroxide, and methyl ethyl ketone peroxide. The preferred thermal initiators, which are more efficient, are benzoyl peroxide, dicumyl peroxide, t-butyl hydroperoxide, t-butyl perbenzoate, di-t-butyl peroxide, bis(t-butyl peroxy isopropyl)benzene, 2,5-dimethyl-2,5-bis(t-butyl peroxy)hexane, azo bis(isobutyronitrile), and cyano t-butyl azo cyclohexane. The most preferred thermal initiator is di-t-butyl peroxide because it is highly reactive, it is a liquid, and it is relatively stable, having a half life of 10 hours at 126° C. Mixtures of thermal initiators are also contemplated.

ACCELERATOR

The composition must include an accelerator to lower the activation energy of the thermal initiator. At least about 0.01% of an accelerator is needed as less is ineffective, but more than about 0.5% is unnecessary.

Non-aromatic accelerators are preferred as it has been found by experiment that most aromatic accelerators do not work well. Amines or amides are preferred as they are more effective. Methyl diethanolamine is the most preferred compound as it has the best reactivity. Other accelerators which are preferred as they make the polymerization reaction go to completion are diethyl formamide, p-toluidine (N,N-dimethyl), and dipropylamine. Other accelerators include dimethyl cyclohexylamine, dimethyl formamide, ethyl amino ethanol, and triethylamine.

Two other useful accelerators are para-toluene sulfonamide and benzoic sulfimide. These compounds contain an —NH group which accelerates the decomposition of peroxide thermal initiators. They can be used in combination with other accelerators for best effect. Mixtures of other accelerators are also contemplated.

FREE RADICAL SCAVENGER

The composition preferably contains a free radical scavenger (also called an "inhibitor") to increase its shelf life. The amount of inhibitor should be at least about 0.01% as less is ineffective, but if more than about 1% is used, the polymerization reaction may not occur. The preferred inhibitor is hydroquinone as it has been found experimentally to work well. Other inhibitors include benzoquinone, cresylic acid, 2,5-dimethyl benzoquinone, and picric acid.

RHEOLOGICAL AGENT

Although preferably not included in the composition, a rheological agent may be used to change rheological properties such as thixotropy or to increase viscosity. A rheological agent should not be reactive with the monomer or other components of the composition. If a rheological agent is used, the amount of it should be at least about 1% as less is ineffective, but more than about 5% may adversely affect the physical properties of the product. Polyamide-modified alkyds may be used to increase thixotropy. Polyvinyl acetate, which is soluble in organic esters, may be added to increase the resin viscosity without imparting thixotropy. Any high molecular weight material which is soluble in the monomer and which has no reactive functionality can be considered as a rheological additive.

THE COMPOSITION

The final composition contains no water or other solvent, but if one of the ingredients is a solid which is insoluble in the composition, it may be necessary to dissolve that ingredient in a small amount of solvent, using no more than necessary, in order to disperse it throughout the composition. Acetone is often useful for this purpose. The acetone then flashes off so that the final composition does not contain a solvent. Some initiators and some accelerators may require dissolution in solvent, but often the ingredients can be selected so as to avoid using a solvent.

The preferred method of preparing the composition is to first dissolve the oligomer, if one is used, in the monomer. To this mixture is added the rheological agent, if used, followed by a pre-mix of the initiators, the accelerator, and the inhibitor, if one is used.

The composition is then coated over a motor stator or other object or a cloth or fabric of glass, Dacron, or other material is impregnated with the composition. The composition is then irradiated with UV light (i.e., 200 to 410 μm) and is left to cure. While it is difficult to specify dosage, a satisfactory dosage is about 200 watts per linear inch for about 0.1 second up to about 5 minutes.

The following examples further illustrate this invention.

EXAMPLE 1

A number of compositions were prepared containing various thermal initiators.

| | |
|---|---|
| Hexanediol diacrylate monomer | 100 pbw |
| Isopropyl ether of benzoin sold by Stauffer Chemical Co. under the trade designation "V10" | 0.075 pbw |
| Benzoic sulfimide | 0.01 pbw |
| Thermal initiator | 0.075 pbw |

The following thermal initiators were used:
methyl ethyl ketone peroxide;
2,5-dimethyl-2,5-bis(hydroperoxy)hexane;
2,5-dimethyl-2,5-bis(t-butyl peroxy)hexane;
bis(t-butyl peroxy i-propyl)benzene;
azo bis isobutyronitrile;
cyano t-butyl azo cyclohexane;
hydrogen peroxide;
dicumyl peroxide;
lauroyl peroxide;
benzoyl peroxide;
cumene peroxide;
t-butyl hydroperoxide;
t-butyl perbenzoate;
di-t-butyl peroxide.

Sample of 10 grams of each of the fourteen compositions were placed in aluminum dishes 2½ inches in diameter and were passed at 40 feet per minute under an RPC QC Processor ultraviolet light containing two bulbs, each producing 200 watts per linear inch. All of the compositions formed a polymeric skin after one pass and reacted completely with a vigorous exotherm after two passes.

When the photo-initiator was omitted from the composition, there was no reaction after thirteen passes.

EXAMPLE 2

Example 1 was repeated using various amine accelerators in the following composition.

| | | |
|---|---|---|
| Trimethylol propane triacrylate | 100 | pbw |
| t-butyl hydroperoxide | 0.04 | pbw |
| "V10" | 0.2 | pbw |
| Amine accelerator | 0.01 | pbw |

After two passes at 100 feet per minute total reaction occurred with the following amine accelerators
methyl diethanolamine;
N,N-diethyl formamide;
N,N-dimethyl p-toluidine;
dipropylamine.

Two passes resulted in an incomplete reaction with the following amines, but additional passes would have completed the reaction.
dimethyl cyclohexylamine;
N,N-dimethyl formamide;
ethyl amino ethanol;
triethylamine.

The following non-aliphatic amines produced a surface skin polymerization but not a thermal reaction:
methyl vinyl pyrrolidone;
diethyl phenylene diamine;
dimethyl benzylamine;
N,N-dimethyl m-toluidine;
p-nitroaniline;
triphenylamine.

EXAMPLE 3

Part A

The 1:1 adduct of toluene diisocyanate and acrylic acid (30 to 70 wt.% in total) was dissolved in a mixture of tetraethylene glycol (3 parts) and ethyl methacrylate (1 part). To this was added "V10" (4 pbw), cumene hydroperoxide (2 pbw), N,N-dimethyl-p-toluidine (0.4 pbw), benzoic sulfimide (0.3 pbw), and hydroquinone (0.04 pbw). A 10 g cake in an aluminum dish was passed through a UV curing processor (2 lamps at 200 W/in) for approximately 10 sec. The reaction mixture then exothermed to give a hard, dry, transparent cake (about 100 mils thick) in about 2 min.

Part B

The reaction in Part A was repeated with 5 plies of glass cloth submerged in the resin. This also gave a hard cake under the same conditions.

Part C

Tetraethylene glycol (TEGDA, 7 pbw) and ethyl methacrylate (EMA, 3 pbw) were mixed with cumene hydroperoxide (2 pbw), N,N-dimethyl-p-toluidine (0.4 pbw), benzoic sulfimide (0.3 pbw), and hydroquinone (0.04 pbw). To this mixture was added V10 at the levels 4, 2, 1, 0.5, 0.3, and 0.1 pbw. Each of these combinations gave a dry cake, with a rubbery consistency, after 10 sec. irradiation and 2 min. exothermic reaction.

Part D

TEGDA (7 pbw), EMA (3 pbw) and V10 (0.1 pbw) were mixed with varying amounts of cumene hydroperoxide and accelerators. The thermal initiator combination was added at levels of 2.7, 2.0, 1.5, 1.0, 0.5, and 0.1 pbw. In all cases, they gave dry, rubbery cakes after irradiation and the subsequent reaction.

EXAMPLE 4

Example 1 was repeated using 100 pbw monomer, 1 pbw "V10", 1 pbw di-tert-butyl perbenzoate, and 1 pbw methyl diethanolamine. Two 200 W/in lamps were used and the sample moved at 40 ft/min. The following gives the results with various monomers tested.

| MONOMER | REACTION |
|---|---|
| Trimethylol Propane Triacrylate | Complete |
| Pentaerythritol Triacrylate | Complete |
| Neopentyl Glycol Diacrylate | Complete |
| Hexanediol Diacrylate | Complete |
| Triethylene Glycol Diacrylate | Complete |
| Tetraethylene Glycol Diacrylate | Complete |
| Hydroxy Ethyl Acrylate | Complete |
| Ethyl Acrylate | Incomplete |
| Butyl Acrylate | Incomplete |
| 2-Ethyl Hexyl Acrylate | Incomplete |
| Phenoxy Ethyl Acrylate | Incomplete |
| Methoxy Ethyl Acrylate | Incomplete |
| Ethoxy Ethoxy Ethyl Acrylate | Incomplete |
| n-Hexyl Acrylate | Incomplete |
| Ethoxy Ethyl Acrylate | Incomplete |
| n-Lauryl Acrylate | Incomplete |
| Trimethylol Propane Trimethacrylate | Complete |
| Triethylene Glycol Dimethacrylate | Complete |
| 1,3 i-Butylene Dimethacrylate | Complete |
| Methacrylic Acid (Glacial) | Complete |
| Hydroxy Propyl Methacrylate | Incomplete |
| 2-Hydroxy Ethyl Methacrylate | Incomplete |
| Methyl Methacrylate | No Reaction |
| Glycidyl Methacrylate | No Reaction |

-continued

| MONOMER | REACTION |
|---|---|
| Ethyl Methacrylate | No Reaction |
| Allyl Methacrylate | No Reaction |
| Cyclohexyl Methacrylate | No Reaction |
| Vinyl Acetate | No Reaction |
| Divinyl Benzene | No Reaction |
| Vinyl Toluene | No Reaction |
| Diallyl Phthalate | No Reaction |
| Diallyl Isophthalate | No Reaction |
| N-Vinyl 2-Pyrrolidone | No Reaction |

The fact that the monomers do not react by themselves does not indicate that they may not react when mixed with more reactive monomers.

EXAMPLE 5

Example 1 was repeated using different concentrations of initiators and accelerators in order to better define operative ranges. The following gives the results of testing three different compositions, each containing different proportions.

| Material | Concentrations which react | | Concentrations which do not react | |
|---|---|---|---|---|
| A. Hexanediol diacrylate | 100 | parts | 100 | parts |
| V10 | 0.02 | part | 0.01 | part |
| Benzoyl peroxide | 0.1 | part | 0.05 | part |
| Triethylamine | 0.01 | part | 0.005 | part |
| Benzoic sulfimide | 0.01 | part | 0.005 | part |
| B. Hexane Diacrylate | 100 | parts | 100 | parts |
| V10 | 0.02 | part | 0.01 | part |
| Di t-butyl peroxide | 0.1 | part | 0.05 | part |
| Dimethyl c-Hexylamine | 0.01 | part | 0.005 | part |
| Benzoic sulfimide | 0.01 | part | 0.005 | part |
| C. Hexanediol diacrylate | 100 | parts | 100 | parts |
| V10 | 0.02 | part | 0.01 | part |
| Cumene hydroperoxide | 0.1 | part | 0.05 | part |
| Methyl diethanolamine | 0.01 | part | 0.005 | part |
| Benzoic sulfimide | 0.01 | part | 0.005 | part |

EXAMPLE 6

The following composition was prepared and cured as in Example 1.

| | |
|---|---|
| Tetraethylene glycol diacrylate | 75 pbw |
| Ethyl methacrylate | 25 |
| Cumene hydroperoxide | 2 |
| N,N-dimethyl-p-toluidine | 0.4 |
| Benzoic sulfimide | 0.3 |
| "V10" | 4.0 |
| Hydroquinone | 0.04 |

Samples of the composition were tested for electrical properties. The following are the results.

| | | |
|---|---|---|
| 60 Hz electric strength on | | |
| 0.1 inch thick resin cake = | 400 | V/mil at 25° C. |
| Dielectric constant at 25° C. = | 4.8 | |
| at 77° C. = | 9.4 | |
| at 104° C. = | 11.0 | |
| Dissipation factor (100 tan δ) at 25° C. = | 3.7% | |
| at 77° C. = | 11.0% | |
| at 104° C. = | 14.0%. | |

These electrical values are acceptable for insulation purposes.

EXAMPLE 7

The following compositions were prepared using various photo-initiators.

| | | |
|---|---|---|
| Trimethylolpropane triacrylate | 100 | pbw |
| Cumene hydroperoxide | 0.075 | |
| N,N-dimethyl-p-toluidine | 0.015 | |
| Benzoic sulfimide | | |
| (10% solution in acetone) | 0.01 | |
| Hydroquinone | 0.0015 | |
| Photo-initiator | 0.2 | |

The compositions were irradiated as in Example 1. The following results were obtained:

| Photo-Initiator | Comment |
|---|---|
| "V10" | Complete reaction in 2 sec. |
| Benzoin butyl ether (sold by Stauffer Chemical Co. under the trade designation "V30") | Complete reaction in 2 sec. |
| Diethoxy acetophenone | Complete reaction in 4 sec. |
| Chlorothioxanthone/methyl diethanolamine (1:1 ratio by wt.) | Complete reaction in 4 sec. |
| A 1:1 weight ratio of Chlorothioxanthone to "Q43", a pentaerithrytol tetrakis (mercaptopropionate) sold by Cincinnati Milicron Co. | Complete reaction in 6 sec. |
| Benzophenone/Methyl diethanolamine (1:1) | Complete reaction in 12 sec. |
| Chlorothioxanthone (saturated solution in acetone) | Complete reaction in 14 sec. |
| Benzophenone | Complete reaction in 20 sec. |
| Benzophenone/Mischler's ketone (1:1) | Complete reaction in 24 sec. |
| Benzophenone/tetrahydrofuran (1:1) | Complete reaction in 24 sec. |
| Mischler's ketone | Surface skin only |
| Mischler's ketone/methyl-diethanolamine (1:1) | Surface skin only |

EXAMPLE 8

10 gram quantities of different combinations of reactants were mixed in aluminum dishes (2.5 in dia.) and irradiated (2 lamps at 200 W/linear inch). The dishes were passed under the lamps at a speed of 40 ft/min, so that each pass was equivalent to about 2 seconds irradiation time. The materials used were 100 pbw hexanediol diacrylate (HDDA) by weight, 0.015 pbw "V10", 0.08 pbw benzoyl peroxide (BP), 0.03 pbw N,N-dimethyl p-toluidine (NNDMT), and 0.03 pbw benzoic sulfimide (BS).

| Reaction Mixture | Comments |
| --- | --- |
| HDDA + "V10" | No reaction after 10 passes |
| HDDA + "V10" + BS | No reaction after 10 passes |
| HDDA + "V10" + BP + BS | No reaction after 10 passes |
| HDDA + "V10" + NNDMT + BS | Slight reaction after 10 passes |
| HDDA + "V10" + BP + NNDMT | Exothermic reaction after 8 passes |
| HDDA + "V10" + BP + NNDMT + BS | Exothermic reaction after 5 passes. |

The above experiments show that unless a photo-initiator, a thermal initiator, and an accelerator are all present, a complete reaction does not occur.

I claim:

1. A solventless liquid resinous composition curable with ultraviolet light without externally applied heat, comprising:
   (1) a liquid monomer having the general formula $CH_2$=CHR where R is an electron-withdrawing organic group;
   (2) about 0.01 to about 4% by weight of a photo-initiator capable of initiating the polymerization of said monomer when exposed to ultraviolet light;
   (3) about 0.01 to about 4% by weight of a thermal-initiator capable of initiating the polymerization of said monomer when activated by the exothermic heat of polymerization, said thermal-initiator being a different compound than said photo-initiator; and
   (4) about 0.01 to about 0.5% by weight of an accelerator capable of lowering the temperature at which said thermal-initiator is activated by heat.

2. A composition according to claim 1 wherein said accelerator is an amine or an amide.

3. A composition according to claim 2 wherein said accelerator is methyl diethanolamine.

4. A composition according to claim 1 wherein said monomer is an acrylate.

5. A composition according to claim 4 wherein said acrylate is selected from the group consisting of tetraethylene glycol diacrylate, 2-hydroxyethyl acrylate, hexanediol diacrylate, trimethylolpropane triacrylate, 2-ethylhexyl acrylate, ethyl methacrylate, and mixtures thereof.

6. A composition according to claim 1 which includes about 0.01 to about 1% by weight of a free radical scavenger to increase the shelf life of said composition.

7. A composition according to claim 6 wherein said free radical scavenger is hydroquinone.

8. A composition according to claim 1 which includes about 20 to about 90% by weight of an oligomer having a molecular weight of up to about 10,000 and having at least one vinyl group.

9. A composition according to claim 8 wherein said oligomer has acrylic or methacrylic functionality, is soluble in said monomer, and has a molecular weight up to 2000.

10. A method of making a cured vinyl addition polymer without using an external source of heat comprising preparing a composition which comprises:
   (1) a liquid monomer having the general formula $CH_2$=CHR where R is an electron-withdrawing organic group;
   (2) about 0.01 to about 4% by weight of a photo-initiator capable of initiating the polymerization of said monomer when exposed to ultraviolet light;
   (3) about 0.01 to about 4% by weight of a thermal-initiator capable of initiating the polymerization of said monomer when activated by the exothermic heat of polymerization, said thermal-initiator being a different compound than said photo-initiator;
   (4) about 0.01 to about 0.5% by weight of an accelerator capable of lowering the temperature at which said thermal-initiator is activated by heat; and exposing said composition to ultraviolet light.

11. A method according to claim 10 wherein a motor stator is coated with said composition prior to said exposure to ultraviolet light.

12. A cured vinyl addition polymer made by the method of claim 10.

13. A composition according to claim 1 which includes a pigment.

14. A method according to claim 10 wherein said composition includes a pigment.

15. A cured vinyl addition polymer according to claim 12 which is pigmented.

16. A method according to claim 10 wherein said accelerator is an amine or an amide.

17. A method according to claim 10 wherein said accelerator is methyl diethanolamine.

18. A method according to claim 10 wherein said monomer is an acrylate.

19. A method according to claim 10 wherein said acrylate is selected from the group consisting of tetraethylene glycol diacrylate, 2-hydroxyethyl acrylate, hexanediol diacrylate, trimethylolpropane triacrylate, 2-ethylhexyl acrylate, ethyl methacrylate, and mixtures thereof.

20. A method according to claim 10 which includes about 0.01 to about 1% by weight of a free radical scavenger to increase the shelf life of said composition.

21. A method according to claim 10 wherein said free radical scavenger is hydroquinone.

22. A method according to claim 10 which includes about 20 to about 90% by weight of an oligomer having a molecular weight of up to about 10,000 and having at least one vinyl group.

23. A method according to claim 10 wherein said oligomer has acrylic or methacrylic functionality, is soluble in said monomer, and has a molecular weight up to 2000.

* * * * *